United States Patent [19]

Meyers

[11] Patent Number: 5,664,253
[45] Date of Patent: Sep. 2, 1997

[54] STAND ALONE PHOTOFINISHING APPARATUS

[75] Inventor: Mark Marshall Meyers, Hamlin, N.Y.

[73] Assignee: Eastman Kodak Company, Rochester, N.Y.

[21] Appl. No.: 628,071

[22] Filed: Apr. 4, 1996

Related U.S. Application Data

[60] Provisional application No. 60/003,637 Sep. 12, 1995.
[51] Int. Cl.$^6$ .......................... G03D 17/00; G03G 21/00
[52] U.S. Cl. .......................... 396/603; 396/622; 399/385; 347/116
[58] Field of Search .................. 354/297, 308–313, 354/322–324, 331, 336; 364/526, 479; 396/551, 564, 622, 308, 626, 630; 347/116, 119; 399/385

[56] References Cited

U.S. PATENT DOCUMENTS

| | | | |
|---|---|---|---|
| 3,683,781 | 8/1972 | Allen | 396/636 |
| 4,185,912 | 1/1980 | Schwartz | 396/603 |
| 4,724,044 | 2/1988 | Weishaar et al. | 396/626 |
| 4,864,354 | 9/1989 | Crasnianski | 396/603 |
| 4,994,827 | 2/1991 | Jamzadeh et al. | 347/116 |
| 5,101,286 | 3/1992 | Patton | 358/487 |
| 5,113,351 | 5/1992 | Bostic | 364/474 |
| 5,132,915 | 7/1992 | Goodman | 364/479 |
| 5,151,717 | 9/1992 | Jamzadeh et al. | 399/385 |
| 5,184,227 | 2/1993 | Foley | 358/302 |
| 5,237,358 | 8/1993 | Yamada et al. | 396/639 |
| 5,353,085 | 10/1994 | Kurematsu et al. | 396/626 |

FOREIGN PATENT DOCUMENTS

| | | |
|---|---|---|
| 0 234 833 | 9/1987 | European Pat. Off. |
| 2 215 554 | 9/1989 | United Kingdom . |
| 2 242 031 | 9/1991 | United Kingdom . |
| 2 286 944 | 8/1995 | United Kingdom . |

*Primary Examiner*—D. Rutledge
*Attorney, Agent, or Firm*—Frank Pincelli

[57] ABSTRACT

A stand alone customer operated photofinishing apparatus. The apparatus includes a film receiving section for receiving and holding a film cartridge containing an undeveloped filmstrip therein from a customer, the filmstrip having at least one image. A customer order data entry station is provided for entering an order selection. The apparatus further includes a developing section for developing the filmstrip comprising at least one processing tank containing a processing solution for processing of the filmstrip, a scanner for scanning the developed filmstrip so as to obtain a digital record of the at least one image developed on the filmstrip, a printing section for dry printing the at least one image on the developed filmstrip using the digital record so as to produce at least one print, and a delivery section for returning the at least one print and the developed filmstrip to the customer. Alternatively, instead of the image to be printed being obtained by scanning a film, the image may be obtained through an input port designed for receiving a digital record from a variety of sources of least one image.

31 Claims, 2 Drawing Sheets

STAND ALONE PHOTOFINISHING APPARATUS

CROSS REFERENCE TO RELATED APPLICATION

Reference is made to and priority claimed from U.S. Provisional application Ser. No. U.S. 60/003,637, filed Sept. 12, 1995, entitled STAND ALONE PHOTOFINISHING APPARATUS.

FIELD OF THE INVENTION

The present invention is directed to photofinishing and, more particularly, to an automated, interactive system for receiving and processing photosensitive film and for dispensing a dry print of the images developed on the film.

BACKGROUND OF THE INVENTION

When developing photographic film, a number of processing solutions are used to develop and stabilize the image on the photographic film. These processing solutions become less effective as the chemical components are consumed and, if left unattended, will eventually stop working as a processing solution. Dispensed solutions must eventually be disposed of, either by pouring down a drain, placed in a storage tank for later transportation and disposal, or be subjected to an incineration process. Dispensed solutions largely consist of water. The photofinisher must provide either a drain and water supply, or deal with transporting large volumes of spent photographic waste to a proper disposal site. In current photofinishing systems, processing must be managed for both the film negative processing, as well as the photographic paper processing.

There has been suggested a fully automated interactive system for processing the photosensitive material. U.S. Pat. No. 5,113,351 discloses an un-manned, automated film processing system, which eliminates all human handling of the film once it is deposited by the customer. However, no attempt is made to minimize the amount of processing solution being used. Since the apparatus is un-manned, it is extremely difficult to control the amount of chemicals being used. In order to assure that the appropriate amount of processing solution is available for processing, excess amounts of replenishment solution is provided for processing, the extra being simply sent to waste. However, doing so unnecessarily increases the amount of effluent present.

The present invention provides a stand alone photofinishing apparatus which requires no plumbing hook-ups and minimizes the amount of fluid generated while continuing to provide a high quality print to be returned to the user.

SUMMARY OF THE INVENTION

In one aspect of the present invention there is provided a stand alone customer operated photofinishing apparatus. The apparatus includes a film receiving section for receiving and holding a film cartridge containing an undeveloped filmstrip therein from a customer, the filmstrip having at least one image. A customer order data entry station is provided for entering an order selection. The apparatus further includes a developing section for developing the filmstrip comprising at least one processing tank containing a processing solution for processing of the filmstrip, a scanner for scanning the developed filmstrip so as to obtain a digital record of the at least one image developed on the filmstrip, a printing section for dry printing the at least one image on the developed filmstrip using the digital record so as to produce at least one print, and a delivery section for returning the at least one print and the developed filmstrip to the customer.

In another aspect of the present invention there is provided a stand alone customer operated photofinishing apparatus. The apparatus includes a customer order data entry station for entering an order selection, a payment mechanism for accepting payment from the customer, an input port for receiving a digital record of the at least one image, a printing section for dry printing the at least one image using the digital record so as to produce at least one print, and a delivery section for returning the at least one print to the customer.

DETAILED DESCRIPTION OF THE INVENTION

Figure 1:
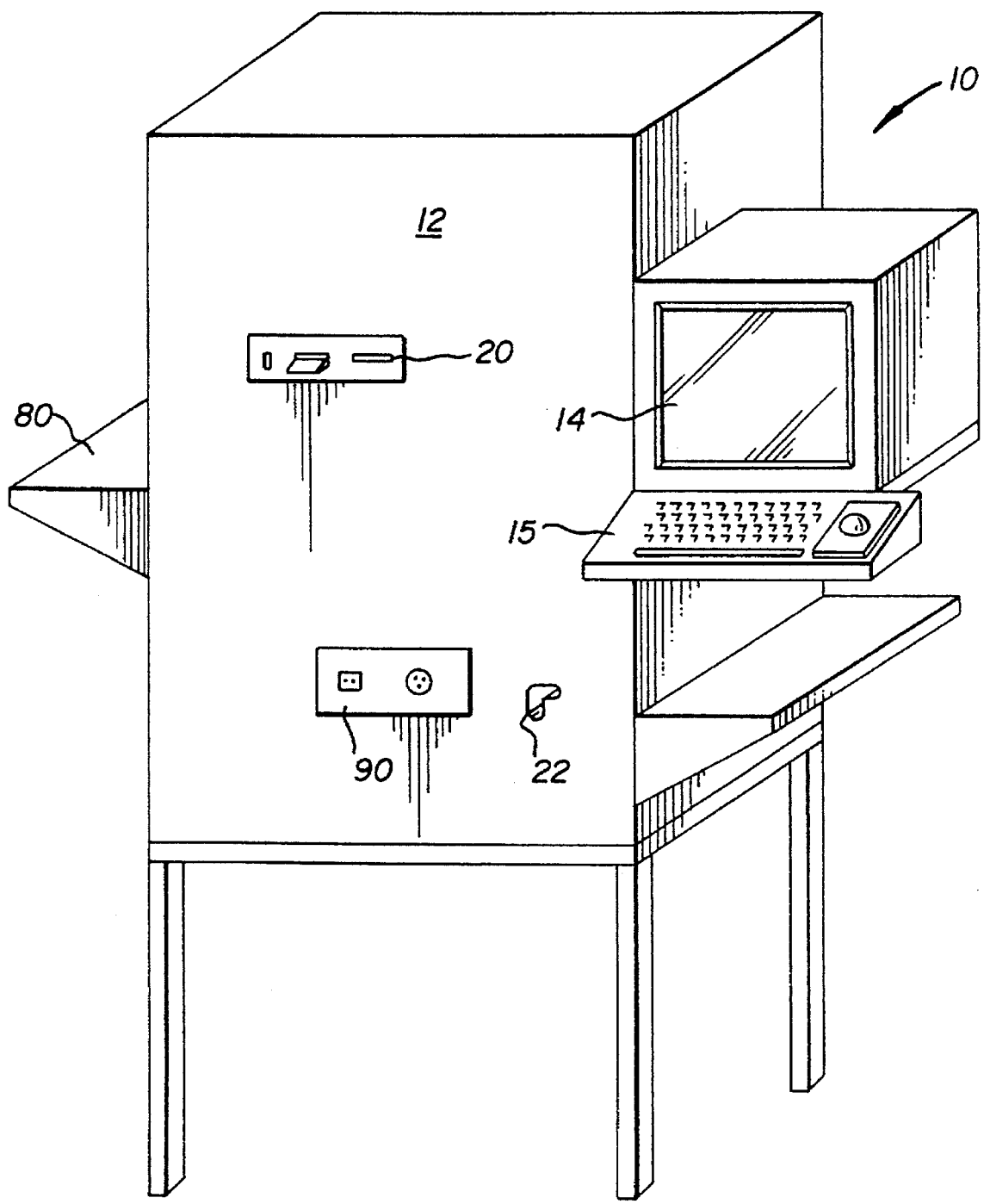
FIG. 1 is a perspective view of an apparatus made in accordance with the present invention.

Referring to the figures, there is illustrated an automated stand alone photofinishing apparatus 10 made in accordance with the present invention. The apparatus includes a control panel 12 and a display device 14. Control panel 12 includes data entry means for entering customer information data relating to the order being placed. In the particular embodiment illustrated, data entry means comprise a keyboard 15 having appropriate identified keys thereon. It is to be understood that the data entry means can be any type device desired. For example, but not byway of limitation, the data entry means may comprise a touch sensitive CRT screen or card reader for reading a customer ID order card, which could include customer photofinishing preferences. Control panel 12 also includes a payment mechanism 17 for accepting payment from a customer. In the particular embodiment illustrated, the payment mechanism is a credit card reader which includes a slot 20 for receipt of a credit card to the payment mechanism. A credit card can also be used to provide customer ID and other information, e.g., address. The payment mechanism may also be designed to receive cash payment, or any other form of acceptable payment.

A cartridge delivery opening 22 is provided for receiving a film cartridge of a predetermined type, or types. In the particular embodiment illustrated, the opening 22 is designed to receive a film cartridge of the thrust type, such as disclosed and described in U.S. Pat. No. 4,834,306, which is hereby incorporated by reference. In these particular type film cartridges, the filmstrip can be thrust out of, or back into the cartridge by rotation of the spool. The trailing end of the film is detachably connected to the spool.

A CPU is provided for controlling operation of the apparatus and the various components therein.

A display device 14 is provided, which in the particular embodiment illustrated, is a video tube (CRT), for displaying instructional order information which is used by the customer for entering appropriate order information. The display device 14 can also be used for various other functions as described later herein, for example, but not byway of limitation, the display device 14 can be used to preview images developed by the photosensitive material prior to printing of the images, and used as a touch screen for customer order selections.

The cartridge delivery opening 22 is such that the film cartridge disposed therein will be forwarded to a processing unit wherein the film contained therein is developed. An example of the possible processing apparatus for processing the film is described in application U.S. Ser. No. 08/330,271; filed Oct. 27, 1994, entitled METHOD AND APPARATUS FOR PROCESSING PHOTOSENSITIVE FILM, now U.S. Pat. No. 5,543,882, by Daniel M. Pagano, Richard B. Wheeler, and Kevin J. Klees, which is hereby incorporated by reference. This application describes an apparatus capable of processing filmstrips without detaching the exposed filmstrip from the cartridge. Elimination of the detach/attach film procedure from the cartridge makes it possible for inclusion of a robust connection between the film and cartridge. This type film cartridge connection helps to insure the film can be readily withdrawn and returned to the cartridge in subsequent stages of image preparation and retrieval.

Figure 2:
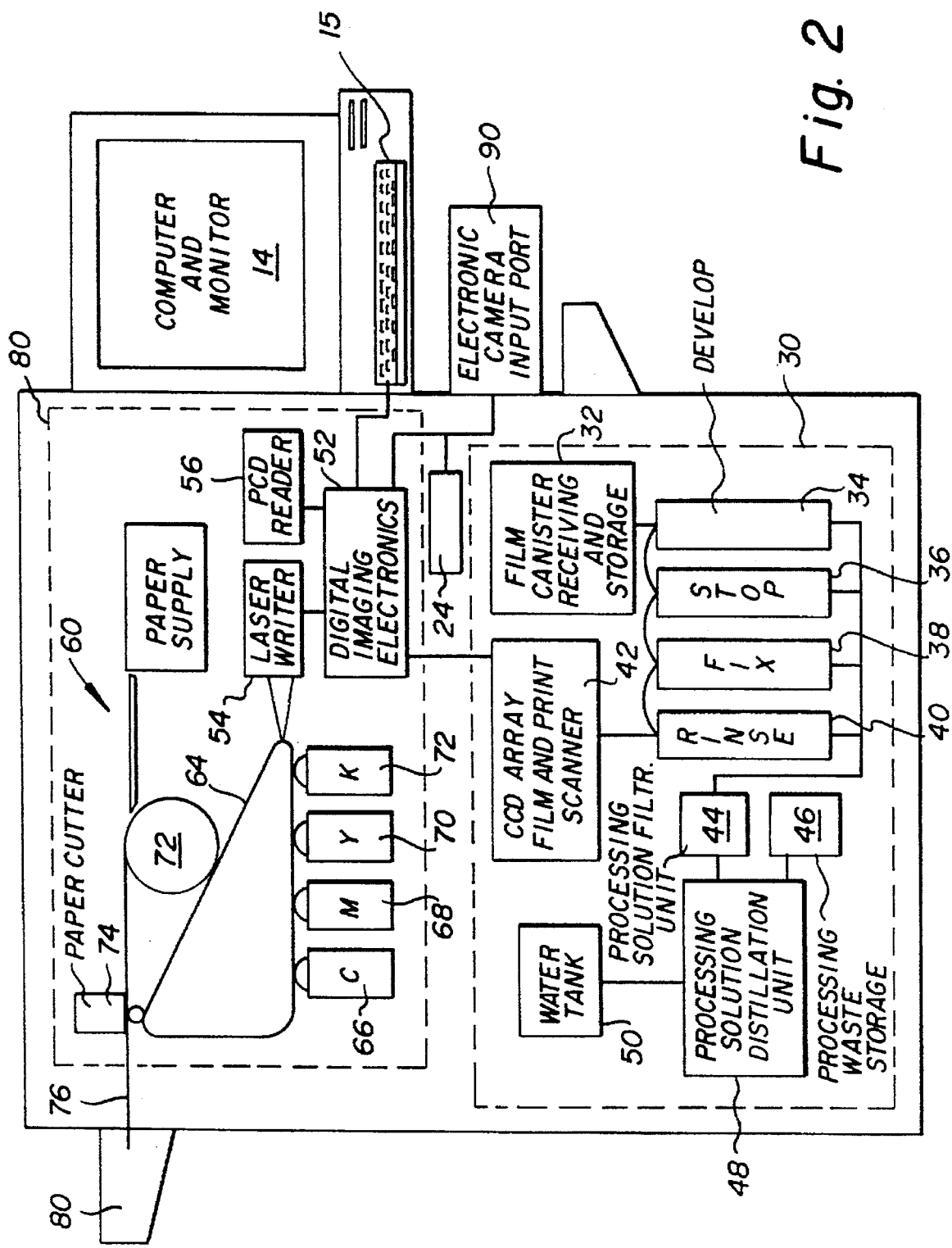
FIG. 2 is a schematic diagram of the apparatus of FIG. 1.

Referring to FIG. 2, there is illustrated a schematic diagram of the apparatus 10. The apparatus 10 includes a film processing section 30 wherein film that is placed through opening 22 is developed. The film processing section includes a cartridge receiving and storage section wherein film cartridges are stored for processing and are queued up so that each individual filmstrip will be subjected to the development process. Appropriate means is provided for removing the filmstrip from the cartridge for processing. In the embodiment illustrated, a thrust type film cartridge is used which simply requires opening of the light lock door and rotation of the cartridge spool which causes the filmstrip to be thrust out of the cartridge. The filmstrip can be detached from the spool in the manner described in application U.S. Ser. No. 08/098,112; filed Jul. 27, 1993, now U.S. Pat. No. 5,465,920, entitled A TOOL AND METHOD FOR DETACHING A TRAILING END PORTION OF A FILMSTRIP FROM AT LEAST ONE HOOK ATOP A RAMP ON A FILM SPOOL INSIDE A FILM CARTRIDGE, by Thomas C. Merle, Dale W. Ryan, and David L. Rowden, herein incorporated by reference, or retained on the cartridge as described in the application of Pagano, Wheeler and Klees previously referred to. The film from receiving storage section 32 goes to a first developing tank 34 and then to a stop tank 36 where the development process stops, and then to a fix tank 38 wherein a fixing solution is applied to the film and then the film is taken to a rinse section 40 where the film is rinsed. The tanks 34, 36, 38, 40 are typical of those found in prior art type processors. After the film leaves tank 40, it is passed by a scanner 42 whereby the film is scanned so as to capture the image that has been developed on the film. In the particular embodiment illustrated, the scanner 42 comprises the CCD (charged coupled device) array whereby the information scanned and converted into digital information is representative of the image scanned. This information is passed on to the print section 60 for printing as is discussed in detail later on herein. A processing solution filtration unit 44 and a processing waste storage unit 46 is provided for processing of the overflow from each of the processing tanks 34, 36, 38, 40. The overflow waste solution is passed from tanks 34, 35, 38, 40 onto processing solution filtration unit 44 wherein particulate matter is removed. Additionally, if desired, appropriate ion exchange materials may be provided in unit 44 for removing undesired ions that may be present in the waste solution. Thereafter, the waste solution is passed from processing unit 44 on to distillation unit 48 wherein water is distilled therefrom, allowing fresh water to flow into tank 50 and the remaining residual material to be passed onto processing waste storage unit 46. The distilled water produced by distillation unit 48 is held in tank 50 and is used in the recirculation system for replenishing of processing solution as typically done in prior art processors. Recovery of water flow by re-utilizing the overflow waste solution from the processing tanks eliminates the need for the processing section to be connected to fixed water supply and/or drain. This allows the apparatus 10 to be placed at locations where plumbing is not available for either supplying of water to the processing section, or for sending the waste material to drain. The residual waste stored in processing waste unit 46 is maintained there until it is serviced, at which time it is removed by an appropriate service technician.

The printing unit 60 includes a digital imaging electronics unit 62 whereby the information scanned by scanner 42 is used for printing. This information is manipulated in accordance with preprogrammed instructions provided by the computer 24, and in accordance with any instructions provided by the customer through control panel 12. The printing section is a dry printing-type process which does not require wet liquids in order to generate a print/image. This again avoids the necessity of being hooked up to plumbing and also eliminates any residual waste typically found in wet processing of photosensitive material. Once the appropriate digital images are captured by the scanner 42 and properly manipulated by digital electronics section 62, prints may be formed by passing the digital information onto laser writer 54, which images onto a photoconductor 64. The printer, in the particular embodiment illustrated, is a color electrophotographic printer, thus there are provided four color toner stations 66, 68, 70, 72. In the particular embodiment illustrated, the toner station 66 is used to transfer cyan color toners; section 68 is used to transfer magenta color toners; section 70 is designed to transfer yellow color toners; and section 72 is designed to transfer black color images onto the photoconductor. The manner of writing digital images and using appropriate color images on the photoconductor is well known and is exemplified by the Kodak 1550 Color Copier. Once the images have been placed on the photoconductor 64, an electrostatic transfer roller 72 is used to obtain the image therefrom and transfer it onto a paper 79, originating from paper supply 73. Once the images have been transferred onto the paper 79, it is passed to cutter 74 wherein the appropriate prints are cut to the appropriate length.

It is, of course, to be understood that digital imaging electronics unit section 62 may manipulate the image in any desired format. For example, the image may be cropped, enlarged, color balanced, or manipulated in any other way which is typically provided by digital printing.

The developed film and prints are then forwarded to delivery section 80, or directly to an initial storage section (not shown). When the film and prints are sent to the internal storage and delivery section each customer order is individually stored, thereby allowing the customer to return at any convenient time. The credit card that was initially used to place the order (or customer receipt received when the order was placed) can also be used to identify the stored customer order and deliver the prints and developed film to the customer upon presentation of the proper credit card and payment. If the customer wishes to have the order immediately dispensed, then the film and prints can be sent directly to the dispensing section where the order can be packaged and dispensed.

In addition, while in the preferred embodiment, initial images may be provided by film. The device can be made universal by providing electronic input port 90 designed to receive digital information representative of images from a variety of sources. For example, electronic port 90 may be designed to receive images from photo CDs, or digital cameras allowing the apparatus to make images from a variety of different sources without any additional modification.

The present invention provides a reproduction system which minimizes the amount of water consumption, and eliminates the need for dedicated plumbing, provides lower generation of effluents, and provides the ability to manipulate the images for reprints, enlargements, and various other image manipulation services. The device may be placed at remote locations and also provides the ability to import image data from various other electronic sources for printing of images. Further, since a dry printing process is used instead of a wet printing process, substantial amounts of time is saved, thus providing quicker processing time from when the print is sent to developing to outputting the print. This not only saves customer waiting time, it substantially improves the amount of processing that can be accomplished by the device.

It is to be understood that various changes and modifications may be made without departing from the scope of the present invention, the present invention being defined by the claims that follow.

Parts List:
10 ... apparatus
12 ... control panel
14 ... display device
15 ... keyboard
17 ... payment mechanism
20 ... slot
22 ... delivery opening
24 ... computer
30 ... processing section
32 ... storage section
34 ... developing tank
36 ... stop tank
38 ... fix tank
40 ... rinse section
42 ... scanner
44 ... filtration unit
46 ... waste storage unit
48 ... distillation unit
50 ... tank
54 ... laser writer
60 ... print section
62 ... electronics unit
64 ... photoconductor
66, 68, 70, 72 ... toner stations
73 ... paper supply
74 ... cutter
79 ... paper
80 ... delivery section
90 ... input port

I claim:

1. A stand alone customer operated photofinishing apparatus comprising:
   a film receiving device for holding a film cartridge containing an undeveloped filmstrip therein from a customer, said filmstrip having at least one image;
   a customer order data entry station for entering an order selection;
   a payment means for accepting payment from the customer;
   developing section for developing said filmstrip, said developing section for developing comprising at least one processing tank containing a processing solution for processing of said filmstrip;
   a scanner for digitally scanning the developed filmstrip so as to obtain a digital record of the at least one image developed on said filmstrip;
   a print section for dry printing the at least one image on said developed filmstrip using the digital record so as to produce at least one print; and
   a storage and/or delivery section for returning the at least one print and said developed filmstrip to the customer.

2. A stand alone customer operated photofinishing apparatus according to claim 1 wherein said customer order data entry station comprises a keyboard.

3. A stand alone customer operated photofinishing apparatus according to claim 1 wherein said customer order data entry station comprises a touch sensitive CRT screen.

4. A stand alone customer operated photofinishing apparatus according to claim 1 wherein said payment means comprises a credit card reader.

5. A stand alone customer operated photofinishing apparatus according to claim 1 wherein said means for digitally scanning the developed filmstrip comprises a CCD array.

6. A stand alone customer operated photofinishing apparatus according to claim 1 wherein said means for developing said filmstrip further comprises a recirculation system having a filtering unit for filtering unwanted particles and/or ions.

7. A stand alone customer operated photofinishing apparatus according to claim 1 wherein said means for developing said filmstrip further comprises a recirculation system having a distillation unit for reusing some of the waste liquid from said at least one processing tank.

8. A stand alone customer operated photofinishing apparatus according to claim 1 wherein the customer order is delivered upon proper presentation of ID.

9. A stand alone customer operated photofinishing apparatus according to claim 8 wherein said ID comprises a credit card that was used initially to place the order.

10. A stand alone customer operated photofinishing apparatus comprising:
    a film receiving station for receiving and holding a film cartridge containing an undeveloped filmstrip provided by a customer, said filmstrip having at least one image;
    a customer order data entry station for entering an order selection;
    payment means for accepting payment from the customer;
    a developing section for developing said filmstrip, said developing section for developing comprising at least one processing tank containing a processing solution for processing of said filmstrip, said means for developing comprising a replenishment system which includes means for supplying replenishment processing solution to said at least one processing tank and means for receiving the overflow of processing solution from said at least one processing tank, distillation means for recovering distilled water from said overflow processing solution and means for using the distilled water in the replenishment system;
    a scanner for scanning the developed filmstrip so as to obtain a digital record of the at least one image developed on said filmstrip;
    a print section for dry printing the at least one image on said developed filmstrip using the digital record so as to produce at least one print; and
    a storage and/or delivery section for returning the at least one print and said developed filmstrip to the customer.

11. A stand alone customer operated photofinishing apparatus according to claim 10 wherein said customer order data entry station comprises a keyboard.

12. A stand alone customer operated photofinishing apparatus according to claim 10 wherein said customer order data entry station comprises a touch sensitive CRT screen.

13. A stand alone customer operated photofinishing apparatus according to claim 10 wherein said payment means comprises a credit card reader.

14. A stand alone customer operated photofinishing apparatus according to claim 10 wherein said means for digitally scanning the developed filmstrip comprises a CCD array.

15. A stand alone customer operated photofinishing apparatus according to claim 10 wherein said means for developing said filmstrip further comprises a recirculation system having a filtering unit for filtering unwanted particles and/or ions.

16. A stand alone customer operated photofinishing apparatus according to claim 10 wherein said means for developing said filmstrip further comprises a recirculation system having a distillation unit for reusing some of the waste liquid from said at least one processing tank.

17. A stand alone customer operated photofinishing system comprising:

a customer order data entry system for obtaining customer order information regarding the printing of images from a digital record supplied by a customer, said filmstrip having at least one image;

a payment mechanism for accepting payment from the customer in response to the customer order entry information provided by the customer;

an input port for receiving a digital record from the customer which is representative of images to be printed by the apparatus;

a printing section for dry printing the image using the digital record supplied by the customer so as to obtain a hard copy of at least one print of the at least one image; and a delivery section for delivering of the at least one print to the customer.

18. A stand alone customer operated photofinishing apparatus according to claim 17 wherein said digital record is supplied by any one of the following devices: photo CD, digital scanning, floppy disk, modem.

19. A stand alone customer operated photofinishing apparatus according to claim 18 wherein said customer order data entry station comprises a keyboard.

20. A stand alone customer operated photofinishing apparatus according to claim 18 wherein said customer order data entry station comprises a touch sensitive CRT screen.

21. A stand alone customer operated photofinishing apparatus according to claim 18 wherein said payment means comprises a credit card reader.

22. A stand alone customer operated photofinishing apparatus according to claim 18 wherein said means for digitally scanning the developed filmstrip comprises a CCD array.

23. A stand alone customer operated photofinishing apparatus according to claim 18 wherein said means for developing said filmstrip further comprises a recirculation system having a filtering unit for filtering unwanted particles and/or ions.

24. A stand alone customer operated photofinishing apparatus according to claim 18 wherein said means for developing said filmstrip further comprises a recirculation system having a distillation unit for reusing some of the waste liquid from said at least one processing tank.

25. A stand alone customer operated photofinishing apparatus comprising:

a film receiving section for receiving and holding a film cartridge containing an undeveloped filmstrip therein from a customer, said filmstrip having at least one image;

a customer order data entry station for entering an order selection;

a developing section for developing said filmstrip, said developing section for developing comprising at least one processing tank containing a processing solution for processing of said filmstrip;

a scanner for scanning the developed filmstrip so as to obtain a digital record of the at least one image developed on said filmstrip;

a printing section for dry printing the at least one image on said developed filmstrip using the digital record so as to produce at least one print; and a delivery section for returning the at least one print and said developed filmstrip to the customer.

26. A stand alone customer operated photofinishing apparatus according to claim 25 wherein said customer order data entry station comprises a keyboard.

27. A stand alone customer operated photofinishing apparatus according to claim 26 wherein said customer order data entry station comprises a touch sensitive CRT screen.

28. A stand alone customer operated photofinishing apparatus according to claim 26 wherein said payment means comprises a credit card reader.

29. A stand alone customer operated photofinishing apparatus according to claim 26 wherein said means for digitally scanning the developed filmstrip comprises a CCD array.

30. A stand alone customer operated photofinishing apparatus according to claim 26 wherein said means for developing said filmstrip further comprises a recirculation system having a filtering unit for filtering unwanted particles and/or ions.

31. A stand alone customer operated photofinishing apparatus according to claim 27 wherein said means for developing said filmstrip further comprises a recirculation system having a distillation unit for reusing some of the waste liquid from said at least one processing tank.

* * * * *